(12) United States Patent
Frost et al.

(10) Patent No.: US 10,492,256 B2
(45) Date of Patent: Nov. 26, 2019

(54) METHOD AND DEVICE FOR CALIBRATING LED LIGHTING

(71) Applicant: Melexis Technologies NV, Tessenderlo (BE)

(72) Inventors: Raik Frost, Efurt (DE); Thomas Freitag, Plaue (DE)

(73) Assignee: MELEXIS TECHNOLOGIES NV, Tessenderlo (BE)

(*) Notice: Subject to any disclaimer, the term of this patent is extended or adjusted under 35 U.S.C. 154(b) by 0 days.

(21) Appl. No.: 16/173,157

(22) Filed: Oct. 29, 2018

(65) Prior Publication Data

US 2019/0132919 A1    May 2, 2019

(30) Foreign Application Priority Data

Oct. 30, 2017 (DE) .................. 10 2017 125 405

(51) Int. Cl.
*H05B 37/02* (2006.01)
*H05B 33/08* (2006.01)

(52) U.S. Cl.
CPC ..... *H05B 33/0818* (2013.01); *H05B 33/0845* (2013.01); *H05B 33/0857* (2013.01);
(Continued)

(58) Field of Classification Search
CPC .............. H05B 33/0857; H05B 33/086; H05B 33/0815; H05B 33/0845
(Continued)

(56) References Cited

U.S. PATENT DOCUMENTS 6,016,038 A    1/2000  Mueller et al.
8,193,737 B2 * 6/2012  Peker .................. G09G 3/3413
                                                 315/155
(Continued)

FOREIGN PATENT DOCUMENTS

EP        3076758 A1   10/2016
WO    2015061237 A1    4/2015

OTHER PUBLICATIONS

German Search Report from DE Application No. 102017125405.6, dated Jun. 13, 2018.
(Continued)

*Primary Examiner* — Thuy V Tran
(74) *Attorney, Agent, or Firm* — Workman Nydegger (57) ABSTRACT

A device having a light emitting diode (LED) of a red-green-blue type, a pulse width modulation (PWM) control, a current supply, and a microcontroller. The RGB LED device arranged for setting a PWM duty cycle using the PWM control and for supplying to the LED either a current of a first value or a current of a second value higher than the first value from the current supply. A method for calibrating the LED of the RGB LED device by measuring sets of tristimulus values when the PWM duty cycle and currents are applied, and calculating from the measured tristimulus values parameters to express colour intensity as a function of PWM duty cycle under the applied current. A method for operating the RGB LED device where calibration parameters linked to the use of a current having a low value and calibration parameters linked to the use of a high current value are determined and used to account for a possible working point shift when switching between the two currents. The calibration parameters including the parameters calculated from sets of tristimulus values to express colour intensity as a function of PWM duty cycle for the applied currents.

15 Claims, 4 Drawing Sheets

(52) U.S. Cl.
CPC ....... *H05B 33/0866* (2013.01); *H05B 33/086* (2013.01); *H05B 33/0815* (2013.01)

(58) Field of Classification Search
USPC ............................................ 315/185 R, 291
See application file for complete search history.

(56) References Cited

U.S. PATENT DOCUMENTS

| | | | |
|---|---|---|---|
| 9,338,851 B2* | 5/2016 | Melanson | H05B 33/0821 |
| 2005/0276053 A1 | 12/2005 | Nortrup et al. | |
| 2009/0090843 A1* | 4/2009 | Lim | H05B 33/0818 |
| | | | 250/205 |
| 2009/0302781 A1 | 12/2009 | Peker et al. | |
| 2013/0169163 A1 | 7/2013 | Swamy et al. | |
| 2014/0022529 A1 | 1/2014 | Mekid | |
| 2014/0225529 A1* | 8/2014 | Beczkowski | H05B 33/0866 |
| | | | 315/297 |
| 2015/0022110 A1 | 1/2015 | Sisto | |

OTHER PUBLICATIONS

Belgian Search Report from BE Application No. 201805735, dated May 13, 2019.

* cited by examiner

METHOD AND DEVICE FOR CALIBRATING LED LIGHTING

FIELD OF THE INVENTION

The present invention is generally related to the field of solutions to control red-green-blue light emitting diodes (RGB LEDs).

BACKGROUND OF THE INVENTION

RGB light emitting diodes (LEDs) are more and more used in numerous lighting applications. Each LED may be controlled individually in intensity and colour by an integrated circuit (IC) via a communication interface. The LEDs may need calibration by means of the IC before use to a given target value.

RGB LEDs are typically Pulse Width Modulation (PWM) driven to set a defined current for each colour channel in order to adjust to certain colour points and colour intensities to obtain a dedicated light output of a given RGB LED. For a given target light output the currents in the different colour channels should not change as this might give rise to a change of the spectrum, resulting to a different colour point and intensity.

For optimal light control a high PWM resolution of at least 18 bits on these currents is needed. On the other hand, the PWM resolution is typically limited to 16 bits. This is because a high PWM resolution also requires a high frequency clock generator. The LED itself is driven in a PWM frequency range of up to 500 Hz, so that the human eye does not see flickering. This would be the case, if lower PWM frequencies were used. As a result, a 16 bit PWM resolution needs a clock source of about 32.768 MHz (65535*500 Hz). Each additional bit increases the required clock signal by factor of two, which may lead to increased electromagnetic emissions and is not cost optimal. Further, the current through the LED needs a certain time to settle, which makes high PWM resolutions useless at low duty cycle values of the PWM. Hence, there is a need for performing light control with a PWM resolution limited to 16 bits.

This problem has been tackled many times in the prior art. For example, WO2015/061237 is concerned with controlling the brightness of a LED display employing a combination of current and PWM dimming of the LEDs. The disclosure offers a solution to deal with the non-linear relationship between the current and the luminous flux, which is applied for dimming the light output in a brightness control.

EP3076758 presents a light regulation loop. A solution for turn on optimization of a driver for one or more light sources is disclosed. A duty cycle value is selected from a table. The selected duty cycle corresponds to the target output current of the driver and has a corresponding voltage. The selected duty cycle is applied to the driver. An output voltage at the light source is measured and compared to the corresponding voltage of the selected duty cycle to produce a voltage comparison result. Based on the comparison result, the selection of the duty cycle is adjusted. Additionally, an output current of the light source is measured and compared to the target output current to produce a current comparison result. An adjustment coefficient is applied to a feedback circuit of the driver based thereon, wherein the feedback circuit adjusts a switching frequency of the driver based on the selected duty cycle.

There is however room for alternatives for performing LED light control over a wide dynamic intensity range with a limited PWM resolution.

SUMMARY OF THE INVENTION

It is an object of embodiments of the present invention to provide for a method for calibrating a RGB LED device. It is also an object of embodiments of the present invention to provide for a method for operating the RGB LED device. It is a further object to provide a RGB LED device.

The above objective is accomplished by the solution according to the present invention.

In a first aspect the invention relates to a method for calibrating a light emitting diode, LED, of a red-green-blue, RGB, LED device, said RGB LED device arranged for setting a pulse width modulation, PWM, duty cycle and for supplying to said LED either a current having a first value or a current having a second value higher than said first value. The method comprises:
  measuring a first set of tristimulus values for the LED when the current having said first value is applied to the LED with a first PWM duty cycle,
  calculating from the measured first set of tristimulus values parameters to express colour intensity as a function of PWM duty cycle when the current having said first value is applied,
  measuring a second set of tristimulus values for the LED when the current having said second value is applied with a second PWM duty cycle, said second PWM duty cycle lower than the first PWM cycle, whereby the resulting current is lower than the current resulting when the current having said first value is applied with the first PWM duty cycle,
  measuring a third set of tristimulus values for the LED when the current having said second value is applied with a third PWM duty cycle, said third PWM duty cycle higher than the first PWM cycle, whereby the resulting current is higher than the current resulting when the current having said first value is applied with the first PWM duty cycle,
  calculating from the measured second and third set of tristimulus values parameters to express colour intensity as a function of PWM duty cycle when the current having said second value is applied.

The proposed solution indeed allows for controlling the RGB LED device. By determining calibration parameters linked to the use of the current having a low value and calibration parameters linked to the use of the high current value, all information is collected needed to account for the possible working point shift when switching between the two currents.

In preferred embodiments the method steps are repeated for each LED of the RGB LED device.

In advantageous embodiments the first PWM duty cycle is equal to 50%. In advantageous embodiments the third PWM duty cycle is equal to 100%.

In embodiments of the invention the calculated parameters are stored in a memory.

Preferably the calculated parameters from the measured first set are used to express colour intensity as a linear function of PWM duty cycle when the current having the first value is applied.

Preferably the function expressing colour intensity as a function of PWM duty cycle when the current having said second value is applied using the calculated parameters from the measured second and third set, is a linear function.

In another aspect the invention relates to a method for operating a red-green-blue, RGB, LED device, comprising
calibrating the RGB LED device as previously described,
receiving tristimulus value information on a target colour point and intensity,
calculating during operation for each LED a PWM duty cycle value, while the current having the first value is applied, thereby exploiting parameters obtained in the calibration step,
checking for each LED if the calculated PWM duty cycle value exceeds a threshold level set to the first PWM duty cycle, and if so, switching for that LED to the current having said second value and calculating the corresponding PWM duty cycle, thereby exploiting parameters obtained in the calibration step.

In one embodiment the switching to the current having said second value is performed after a given time interval has elapsed.

In a preferred embodiment the threshold level equals the first PWM duty cycle.

In a further aspect the invention relates to a RGB LED device comprising
a red, green and blue LED,
pulse width modulation, PWM, control means for setting a PWM duty cycle value,
current supply means for supplying to the LEDs either a current having a first value or a current having a second value higher than said first value,
a controller comprising a processing means arranged for
receiving information on a target colour point and target intensity,
calculating from a measured first set of tristimulus values parameters to express colour intensity as a function of PWM duty cycle when said current having said first value is applied,
calculating from a measured second and third set of tristimulus values parameters to express colour intensity as a function of PWM duty cycle when said current having said second value is applied, said second set measured when said current having said second value is applied with a second PWM duty cycle, said second PWM duty cycle lower than said first PWM cycle, whereby the resulting current is lower than the current resulting when said current having said first value is applied with said first PWM duty cycle, said third set of tristimulus values measured when said current having said second value is applied with a third PWM duty cycle, said third PWM duty cycle higher than said first PWM cycle, whereby the resulting current is higher than the current resulting when said current having said first value is applied with said first PWM duty cycle,
said RGB LED device further comprising storage means for storing said calculated parameters.

In a preferred embodiment the current supply means comprises a current selector for selecting either the current having said first value or the current having said second value higher than said first value.

In other embodiments the current supply means comprises a single current source to provide either the current having said first value or the current having said second value higher than said first value.

In embodiments the current supply means comprises two current sources.

In other embodiments the current supply means comprises a switchable element controllable by the PWM control means.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

The present invention will be described with respect to particular embodiments and with reference to certain drawings, but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a calibration method for a RGB LED device for use over a wide dynamic intensity range with a limited PWM resolution.

Figure 1:
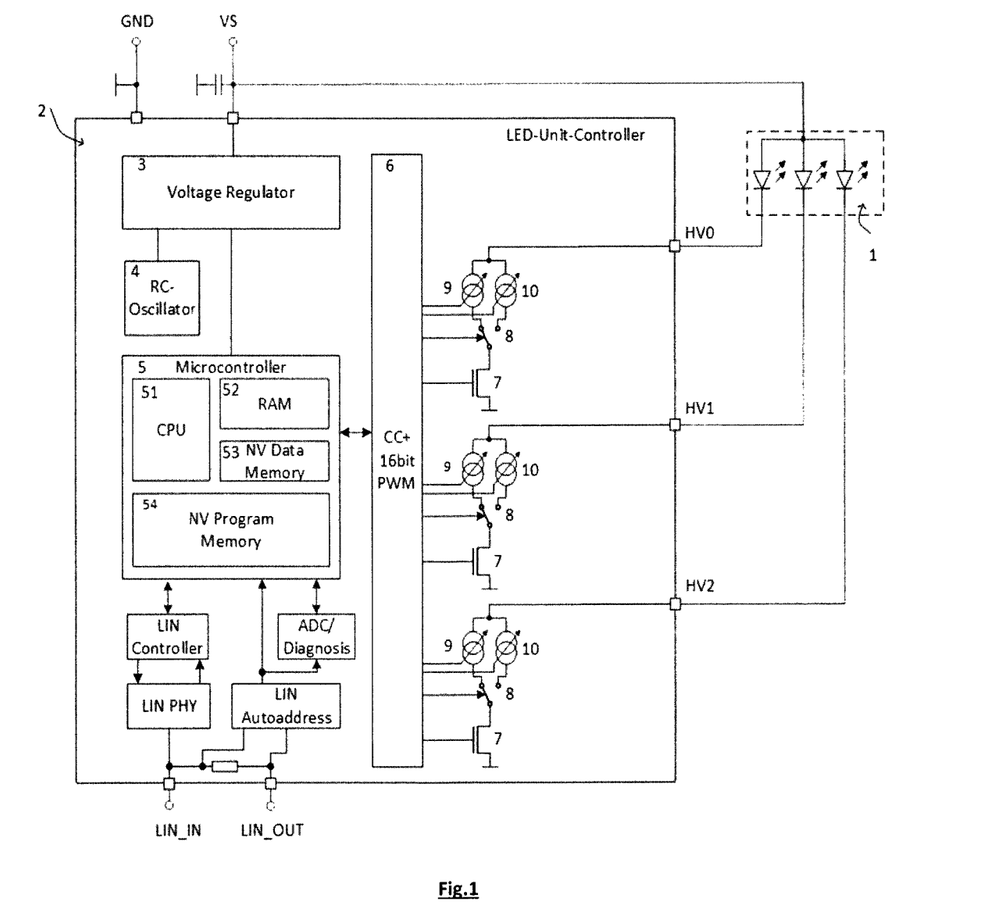
FIG. 1 illustrates a LED device according to an embodiment of the present invention.

The LED device of FIG. 1 is considered. The LED device comprises a red-green-blue light emitting diode (RGB LED) (1) and a RGB LED controller (2). In one embodiment this is realized e.g. as an integrated circuit (IC).

In the embodiment of FIG. 1 the RGB LED controller comprises a voltage regulator (3) capable of regulating an external supply voltage VS down to an internal supply voltage for the integrated circuit. In automotive environments this external supply might not be stable.

An RC oscillator (4) provides a system clock to a microcontroller (5) and the current source and PWM control (6). The microcontroller comprises a central processing unit (CPU) (51), a random access memory (RAM) (52), a non-volatile data memory (e.g. EEPROM, NVRAM) (53) and a non-volatile program memory (e.g. ROM, Flash, OTP) (54).

The microcontroller can receive information for a given target colour point and colour intensity via a bus interface, e.g. a LIN interface, from a higher-level unit (not shown in FIG. 1).

In the approach according to the invention the RGB LED is driven by means of two different continuous currents, i.e. a low current and a high current, which are selectable by a current selector (8). Note however that the proposed approach can readily be extended to the use of more than two currents. In the further explanation below a current of a first, low value and a current of a second value higher than that low value are considered.

In certain embodiments, e.g. the one illustrated in FIG. 1, two independently controllable current sources (9,10) are provided to set the currents. In preferred embodiments there is only a single current source capable of providing alternately the high and the low current as defined by the current selector. The selected current can also be controlled by a PWM via a switchable element (7), which allows a wide dynamic range in intensity per colour channel. The setting of the current sources, the selection of the currents and the PWM settings are provided by the microcontroller (5) in cooperation with the current source(s) and the PWM control (6).

The low and high current may be controlled for instance in steps of 3 mA between e.g. 0 mA and e.g. 30 mA. Preferably the low current is kept at e.g. 3 mA or 6 mA or any other current lower than the high current. The higher current is preferably kept at 30 mA or 27 mA or any other value higher than the low current.

For a given light scene (e.g. colour point and colour intensity), a fixed low current value and fixed high current value are programmed. In a given light scene the two fixed currents together with the current selector and the PWM control on the PWM controllable switching element (7) are used to adjust the light output to a given colour point and colour intensity.

Figure 2:
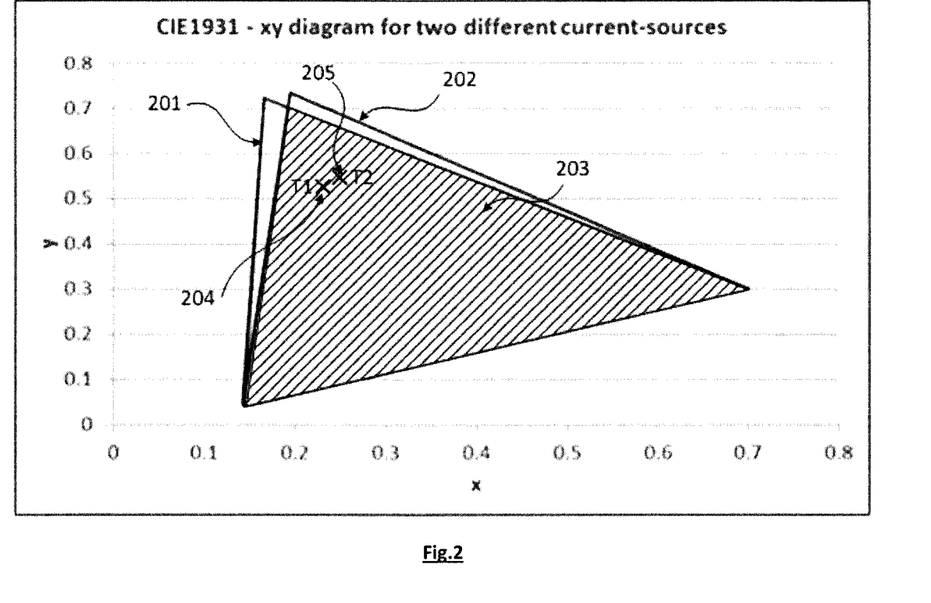
FIG. 2 illustrates a colour gamut triangle for two different current values.

The change of current from a selected low current to a selected high current for one or more colour channels of a given RGB LED results in a shifted colour gamut triangle (from triangle (201) to triangle (202)) as shown in FIG. 2 as the working point of the one or more LEDs is shifted from point T1 (204) to point T2 (205) and thus the light output spectrum of the RGB LED shifts as well. Only colour points inside a common colour gamut (203), built from the gamut diagrams of the two selected currents, can be displayed when using the two current values. A gamut is the complete subset of colours which can be accurately represented by a certain device. A gamut of an RGB LED panel is represented by a triangle in a CIE 1931 colour space chromaticity diagram.

In case the target colour point is outside the common colour gamut (203), the common colour gamut can be used to calculate a closest colour point to the target colour point, which is displayable by both selected current values. This closest colour point is then used in a given light scene.

As the change between a selected low current and high current shifts the spectrum, it is mandatory to calibrate the RGB LED for the two current values, that are used for each colour channel.

The present invention proposes an alternative and novel way to carry out the calibration.

In a preferred embodiment the calibration is done for all three LEDs of a RGB LED at three characteristic working points, i.e.:

at a selected fixed low current (I_low) at a given PWM duty cycle value PWMsp, e.g. 50%, at a selected high current (I_high) at a PWM duty cycle PWMlow lower than PWMsp, whereby the high current value and the applied PWM duty cycle PWMlow are so chosen that the resulting current is smaller than the resulting current when the low current (I_low) is used, i.e. I_high*PWMlow<I_low*PWMsp, at the selected high current (I_high) at a PWM duty cycle PWMmax, typically the maximum of 100%. The resulting current I_high*PWMmax is higher than the resulting current I_low*PWMsp when the low current is used.

The colour scene (colour point and colour intensity) can be described and measured as X, Y, Z values (CIE1931 colour coordinates) during a spectral optical measurement. This is known in the art and briefly explained here. The CIE XYZ colour space encompasses all colour sensations that are visible to a person with average eyesight. Therefore, CIE XYZ (the so-called tristimulus values) is a device-invariant representation of colour. It serves as a standard reference against which many other colour spaces are defined. A set of colour matching functions, like the spectral sensitivity curves of the LMS colour space, but not restricted to non-negative sensitivities, associates physically produced light spectra with specific tristimulus values.

During the calibration the currents are selected and applied and various PWM duty cycles are used. The X, Y, Z values for the single red, green, blue LED of the RGB LED are measured in a spectral way by means of e.g. an optical array spectrometer. The measurements can be performed in a serial way. This means each LED (red, green and blue) is exercised with the currents with the PWM duty cycles in a serial manner.

All this results into 3 times three measurements for the calibration of the RGB LED:
1. XLEDred, YLEDred, ZLEDred measured @ I_low and PWM duty cycle PWMsp (50%)
2. XLEDgreen, YLEDgreen, ZLEDgreen measured @ I_low and PWM duty cycle PWMsp (50%)
3. XLEDblue, YLEDblue, ZLEDblue measured @ I_low and PWM duty cycle PWMsp (50%)
4. XLEDred, YLEDred, ZLEDred measured @ I_high and PWM duty cycle PWMlow (<50%)
5. XLEDgreen, YLEDgreen, ZLEDgreen measured @ I_high and PWM duty cycle PWMlow (<50%)
6. XLEDblue, YLEDblue, ZLEDblue measured @ I_high and PWM duty cycle PWMlow (<50%)
7. XLEDred, YLEDred, ZLEDred measured @ I_high and PWM duty cycle PWMmax (100%)
8. XLEDgreen, YLEDgreen, ZLEDgreen measured @ I_high and PWM duty cycle PWMmax (100%)
9. XLEDblue, YLEDblue, ZLEDblue measured @ I_high and PWM duty cycle PWMmax (100%)

The selection of the currents and PWM duty cycles during calibration is made considering that a given target colour point can be displayed by combining any fixed current value of the selected fixed low current or the selected fixed high current with a suitably adjusted PWM duty cycle value, as also illustrated in FIG. 2.

Figure 3:
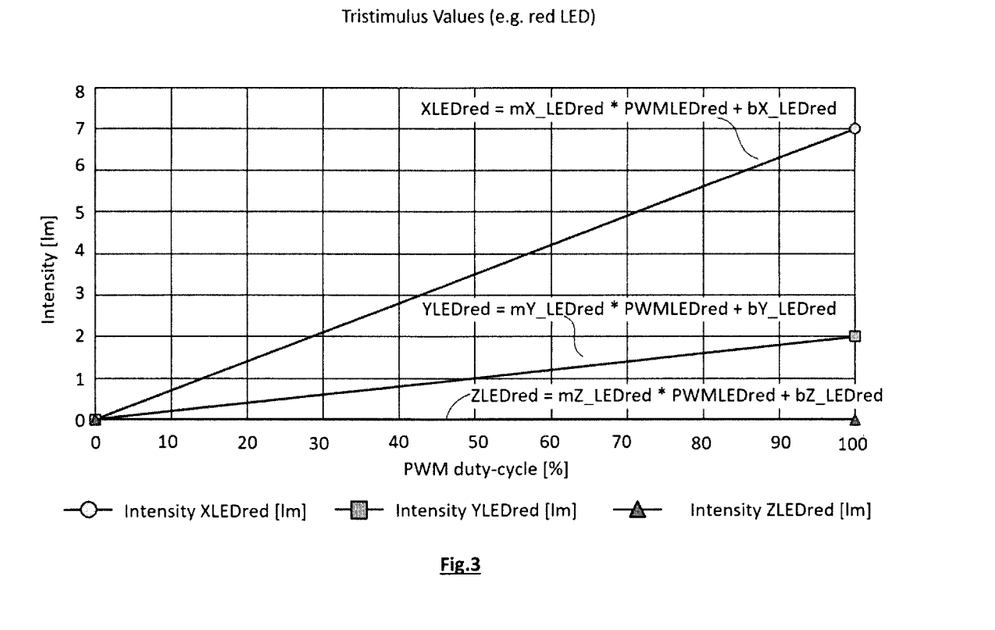
FIG. 3 illustrates a possible behaviour of the tristimulus values for a red LED as a function of the PWM duty cycle when a low current is applied.

FIG. 3 shows the tristimulus values XLEDred, YLEDred, ZLEDred in function of PWM duty cycles for instance for the red LED. As the tristimulus values behave almost linear over current, linear equations for each tristimulus value can be set up:

$$XLEDred = mX\_LEDred * PWMLEDred + bX\_LEDred$$

$$XLEDgreen = mX\_LEDgreen * PWMLEDgreen + bX\_LEDgreen$$

$$XLEDblue = mX\_LEDblue * PWMLEDblue + bX\_LEDblue$$

$$YLEDred = mY\_LEDred * PWMLEDred + bY\_LEDred$$

$$YLEDgreen = mY\_LEDgreen * PWMLEDgreen + bY\_LEDgreen$$

$$YLEDblue = mY\_LEDblue * PWMLEDblue + bY\_LEDblue$$

$$ZLEDred = mZ\_LEDred * PWMLEDred + bZ\_LEDred$$

$$ZLEDgreen = mZ\_LEDgreen * PWMLEDgreen + bZ\_LEDgreen$$

$$ZLEDblue = mZ\_LEDblue * PWMLEDblue + bZ\_LEDblue \tag{11}$$

whereby the target colour point/intensity has tristimulus values X, Y, Z given by the expressions $$X = XLEDred + XLEDgreen + XLEDblue$$

$$Y = YLEDred + YLEDgreen + YLEDblue$$

$$Z = ZLEDred + ZLEDgreen + ZLEDblue \tag{12}$$

The basis for starting the further calculations is the selected fixed low current I_low. As can also be seen in FIG. 3, the intercept to the y-axis is always zero for this case, thus bX=bY=bZ=0 for all LEDs red, green and blue in the equations (1) above. This means the following variables can be derived out of the measurements described above for the selected fixed low current:

$$mX\_LEDred = XLEDred / PWMsp, \text{ with } XLEDred \text{ measured}, PWMsp=50\% \text{ applied}$$

$$mY\_LEDred = YLEDred / PWMsp, \text{ with } YLEDred \text{ measured}, PWMsp=50\% \text{ applied}$$

$$mZ\_LEDred = ZLEDred / PWMsp, \text{ with } ZLEDred \text{ measured}, PWMsp=50\% \text{ applied}$$

$$mX\_LEDgreen = XLEDgreen / PWMsp, \text{ with } XLEDgreen \text{ measured}, PWMsp=50\% \text{ applied}$$

$$mY\_LEDgreen = YLEDgreen / PWMsp, \text{ with } YLEDgreen \text{ measured and } PWMsp=50\% \text{ applied}$$

$$mZ\_LEDgreen = ZLEDgreen / PWMsp, \text{ with } ZLEDgreen \text{ measured and } PWMsp=50\% \text{ applied}$$

$$mX\_LEDblue = XLEDblue / PWMsp, \text{ with } XLEDblue \text{ measured}, PWMsp=50\% \text{ applied}$$

$$mY\_LEDblue = YLEDblue / PWMsp, \text{ with } YLEDblue \text{ measured and } PWMsp=50\% \text{ applied}$$

$$mZ\_LEDblue = ZLEDblue / PWMsp, \text{ with } ZLEDblue \text{ measured and } PWMsp=50\% \text{ applied} \tag{13}$$

Hence, for the selected fixed low current all unknown variables (e.g. for the red LED: mX_LEDred, mY_LEDred, mZ_LEDred) of the equations (11) have been determined in this calibration step via the measurements 1, 2 and 3.

As the switch from the selected fixed low current to the selected fixed high current may also result in a different working point of the LED, the colour spectrum may shift from T1 to T2 as shown in FIG. 2. This also means that for the calibration at the selected fixed high current, the intercept of the y-axis in the tristimulus graph might not be zero anymore. Therefore it is needed to perform the calibration at the selected high current using a current value (I_high) and two different PWM duty cycle values as previously described (see measurements 4 to 9).

As in the application case either the fixed low current or the fixed high current is used and the selection criterion is set at a PWM duty cycle value PWMsp, the calibration at the selected fixed high current needs to be done below the switching point (thus <50% PWM duty cycle and a value for I_high so chosen that the resulting current is below I_low and another reference point with e.g. 100% duty cycle. The calibration below the current switching point ensures a smooth transition when the current is switched from the selected fixed low current to the selected fixed high current or vice versa. The linear equations can be set up between both measured points for all tristimulus values in the following way according to FIG. 3 so that the unknown variables can be derived for the selected high current:

$$mX\_LEDred=(XmaxLEDred-XlowLEDred)/(PWMmax-PWMlow),$$

$$bX\_LEDred=XmaxLEDred-mX\_LEDred*PWMmax$$

with XmaxLEDred, XlowLEDred measured, PWMmax and PWMlow applied $$mY\_LEDred=(YmaxLEDred-YlowLEDred)/(PWMmax-PWMlow),$$

$$bY\_LEDred=YmaxLEDred-mY\_LEDred*PWMmax$$

with YmaxLEDred, YlowLEDred measured, PWMmax and PWMlow applied $$mZ\_LEDred=(ZmaxLEDred-ZlowLEDred)/(PWMmax-PWMlow),$$

$$bZ\_LEDred=ZmaxLEDred-mZ\_LEDred*PWMmax$$

with ZmaxLEDred, ZlowLEDred measured, PWMmax and PWMlow applied $$mX\_LEDgreen=(XmaxLEDgreen-XlowLEDgreen)/(PWMmax-PWMlow),$$

$$bX\_LEDgreen=XmaxLEDgreen-mX\_LEDgreen*PWMmax$$

with XmaxLEDgreen, XlowLEDgreen measured, PWMmax and PWMlow applied $$mY\_LEDgreen=(YmaxLEDgreen-YlowLEDgreen)/(PWMmax-PWMlow),$$

$$bY\_LEDgreen=YmaxLEDgreen-mY\_LEDgreen*PWMmax$$

with YmaxLEDgreen, YlowLEDgreen measured, PWMmax and PWMlow applied $$mZ\_LEDgreen=(ZmaxLEDgreen-ZlowLEDgreen)/(PWMmax-PWMlow),$$

$$bZ\_LEDgreen=ZmaxLEDgreen-mZ\_LEDgreen*PWMmax$$

with ZmaxLEDgreen, ZlowLEDgreen measured, PWMmax and PWMlow applied $$mX\_LEDblue=(XmaxLEDblue-XlowLEDblue)/(PWMmax-PWMlow),$$

$$bX\_LEDblue=XmaxLEDblue-mX\_LEDblue*PWMmax$$

with XmaxLEDblue, XlowLEDblue measured, PWMmax and PWMlow applied $$mY\_LEDblue=(YmaxLEDblue-YlowLEDblue)/(PWMmax-PWMlow),$$

$$bY\_LEDblue=YmaxLEDblue-mY\_LEDblue*PWMmax$$

with YmaxLEDblue, YlowLEDblue measured, PWMmax and PWMlow applied $$mZ\_LEDblue=(ZmaxLEDblue-ZlowLEDblue)/(PWMmax-PWMlow),$$

$$bZ\_LEDblue=ZmaxLEDblue-mZ\_LEDblue*PWMmax$$

with ZmaxLEDblue, ZlowLEDblue measured, PWMmax and PWMlow applied

Hence, also for the selected fixed high current, all unknown variables (e.g. for the red LED: mX_LEDred, bX_LEDred, mY_LEDred, bY_LEDred, mZ_LEDred, bZ_LEDred) of the equations (1) have been determined in this calibration step out of the measurements 4 to 9.

The parameters derived in this calibration step can be put into the non-volatile data memory (53) as a data array.

The calibration data can further be used to calculate any PWM value to be applied in order to reach a certain colour scene (colour point, colour intensity) which is described via X, Y and Z when using a fixed selected low current or a fixed selected high current. In other words, the RGB LED controller (2) may receive the target light scene information X, Y, Z from a higher level unit e.g. via a LIN bus connection and it might calculate the PWM settings via the equation matrix shown in (11) for a selected fixed low or a fixed high current exploiting the parameters derived in the calibration step and stored in the non-volatile data memory (53).

Current Selection During Operation

Figure 4:
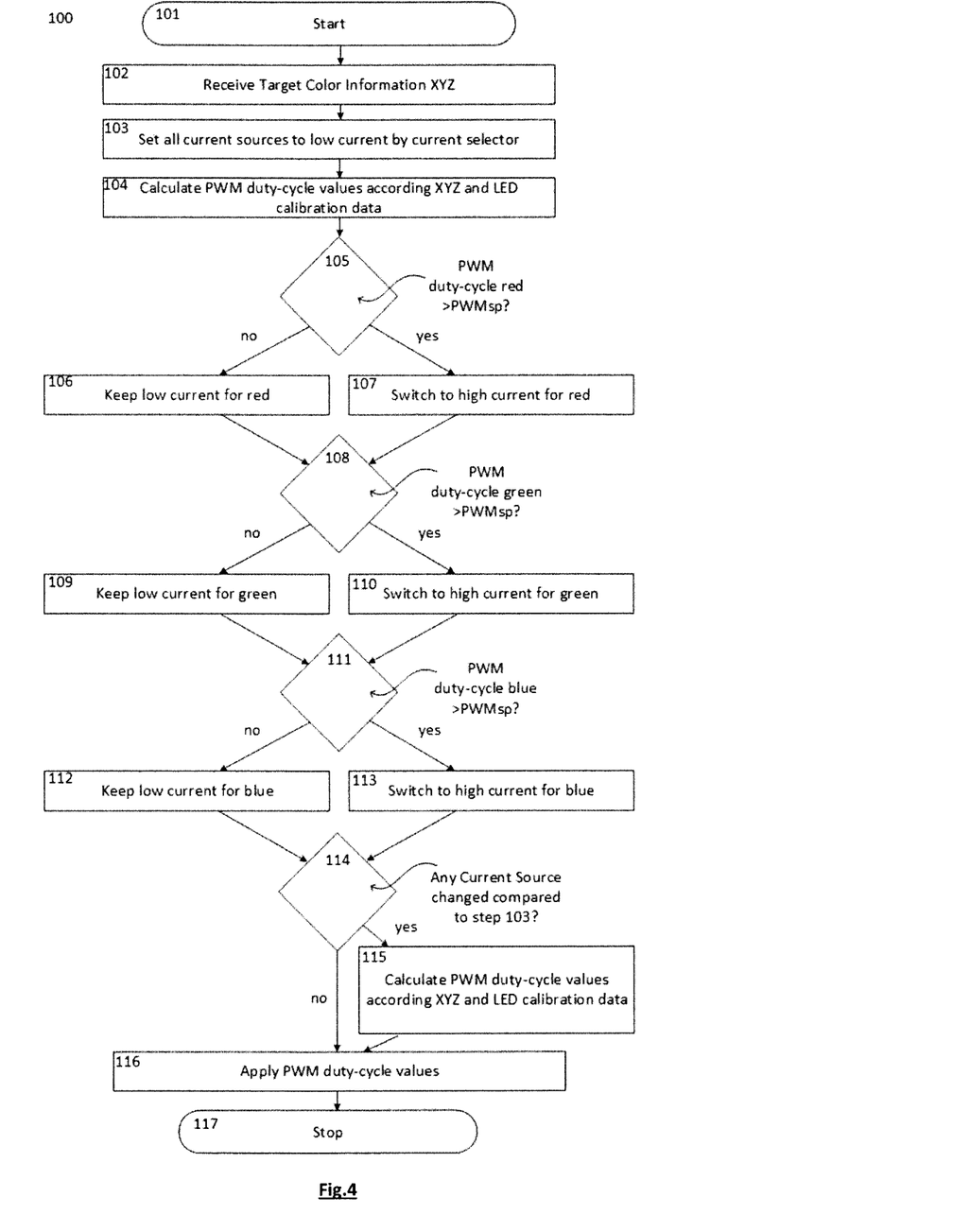
FIG. 4 illustrates an embodiment of operating a RGB LED device calibrated according to the present invention.

FIG. 4 describes an embodiment of a method for setting of the current source (100), thus how to select during operation the current to be used, i.e. a low current or a high current.

After starting (101) the operation, the RGB LED controller (2) receives the target colour information X, Y, Z (102). First the fixed low current (103) is selected for all LEDs (red, green, blue) and the current source(s) is (are) switched accordingly. PWM values are calculated based on the calibration data and the equation matrix shown in (11) for the selected fixed low current (104).

In a determination step (105) it is checked if the PWM duty cycle for the red LED is >PWMsp, e.g. >50%. In case this is true, the fixed high current is selected (107), in case this is not true, the selected fixed low current is kept (106).

In a next step (108) it is checked if the PWM duty cycle for another LED, e.g. the green LED, is >PWMsp. In case this is true, the fixed high current is selected (110); in case this is not true, the selected fixed low current is kept (109).

In a following determination step (111) it is checked if the PWM duty cycle for the third LED, e.g. the blue LED, is >PWMsp. In case this is true, the fixed high current is selected (113); in case this is not true, the selected fixed low current is kept (112).

After that, it is checked whether one or more currents have been switched from a selected fixed low current to a selected fixed high current (114). In case this is true, all PWM values are calculated using the calibration data and the equation matrix in (1) for the selected currents (115); in case this is not true, the PWM values of step 104 is kept. The selected PWM values are applied (116) and the routine is stopped (117).

The routine can be used in case X, Y, Z values are updated from an applied light scene to a new light scene. Further, the new PWM values are calculated first and applied in a synchronous manner in step 116. This ensures that no flickering might be received in case light scenes are updated very often.

In another embodiment the currents are not switched immediately after the determination steps. The selection is just memorized. The switch of the current might be applied in a synchronous manner also in step 116, when the new calculated PWM values are applied.

The routine can also be applicable if more fixed currents than just a selected fixed low and high current are used. This increases the calibration efforts, as also for these currents a calibration as previously described, needs to be applied. On the other hand, any additional current enlarges again the resolution achievable with a 16-bit PWM.

Using the approach presented here, the following resolution can be achieved. With a selected fixed low current of e.g. 3 mA a 16 bit PWM resolution leads to a current resolution of 3 mA/65535=45.7 nA. This gives a good resolution on a given light scene to be displayed. For comparison, if the proposed approach would not be applied and only a maximum current of e.g. 30 mA would be used, a 16-bit PWM resolution would lead to a resolution of 0.457 µA per bit or PWM step. This is equivalent to ca. only 6556 PWM steps or circa 12 bit to display a current of e.g. 3 mA. This resolution is not sufficient and may lead to a non-precise colour point.

An alternative way would be to increase the PWM resolution. In order to achieve the same resolution as with a 16-bit PWM, one might for example have 30 mA/45.7 nA=656455 or about 19-bit. However, a drawback of using a 19-bit PWM is the much higher clock frequency. This might lead to an increased electromagnetic emission and possibly also higher costs.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for calibrating at least one a light emitting diode (LED) of a red-green-blue (RGB) LED device, the method comprising:
    measuring a first set of tristimulus values for said at least one LED when a RGB LED control device of said RGB LED device supplies a current of a first value to said at least one LED and applies a first PWM duty cycle, said current of said first value to which said first PWM duty cycle is applied being a first resulting current;
    calculating, from said measured first set of tristimulus values, parameters to express colour intensity as a function of PWM duty cycle value when said current of said first value is supplied to said at least one LED;
    measuring a second set of tristimulus values for said at least one LED when said RGB LED control device of said RGB LED device supplies a current of a second value higher than said first value and applies a second PWM duty cycle, said second PWM duty cycle lower than said first PWM duty cycle, said current of said second value to which said second PWM duty cycle is applied being a second resulting current, whereby the second resulting current is lower than the first resulting current;
    measuring a third set of tristimulus values for said at least one LED when said RGB LED control device of said RGB LED device supplies said current of said second value and applies a third PWM duty cycle, said third PWM duty cycle higher than said first PWM duty cycle, said current of said second value to which said third PWM duty cycle is applied being a third resulting current, whereby the third resulting current is higher than the first resulting current; and
    calculating, from said measured second and third set of tristimulus values, parameters to express the colour intensity as a function of PWM duty cycle value when said current of said second value is applied to said at least one LED.

2. The method for calibrating as in claim 1, wherein the method steps are performed for each LED of said RGB LED device.

3. The method for calibrating as in claim 1, wherein said first PWM duty cycle is equal to 50%.

4. The method for calibrating as in claim 1, wherein said third PWM duty cycle is equal to 100%.

5. The method for calibrating as in claim 1, further comprising storing the calculated parameters in a memory.

6. The method for calibrating as in claim 1, wherein said calculated parameters from said measured first set are used to express the colour intensity as a linear function of PWM duty cycle value when said current of said first value is applied to said at least one LED.

7. The method for calibrating as in claim 1, wherein said calculated parameters from said measured second and third set are used to express the colour intensity as a linear function of PWM duty cycle value when said current of said second value is applied to said at least one LED.

8. A method for operating a red-green-blue light emitting diode (RGB LED) device, the method comprising:
    calibrating said RGB LED device by, for at least one LED of said RGB LED device:
        measuring a first set of tristimulus values for said at least one LED when a RGB LED control device of said RGB LED device supplies a current of a first value to said at least one LED and applies a first PWM duty cycle, said current of said first value to which said first PWM duty cycle is applied being a first resulting current,
        calculating, from said measured first set of tristimulus values, parameters to express colour intensity as a function of PWM duty cycle value when said current of said first value is supplied to said at least one LED,
        measuring a second set of tristimulus values for said at least one LED when said RGB LED control device of said RGB LED device supplies a current of a second value higher than said first value and applies a second PWM duty cycle, said second PWM duty cycle lower than said first PWM duty cycle, said current of said second value to which said second PWM duty cycle is applied being a second resulting current, whereby the second resulting current is lower than the first resulting current, measuring a third set of tristimulus values for said at least one LED when said RGB LED control device of said RGB LED device supplies said current of said second value and applies a third PWM duty cycle, said third PWM duty cycle higher than said first PWM duty cycle, said current of said second value to which said third PWM duty cycle is applied being a third resulting current, whereby the third resulting current is higher than the first resulting current, and calculating, from said measured second and third set of tristimulus values, parameters to express the colour intensity as a function of PWM duty cycle value when said current having said second value is applied to said at least one LED;

receiving tristimulus value information on a target colour point and intensity;

calculating during operation for each LED of said RGB LED device a PWM duty cycle value, while said current of said first value is applied, thereby exploiting parameters obtained in said calibration step; and checking for each LED of said RGB LED device if the calculated PWM duty cycle value exceeds a threshold level, wherein the same threshold level is used to check each LED of said RGB LED device, and if so, switching for each LED of said RGB LED device to said current of said second value and calculating the corresponding PWM duty cycle, thereby exploiting parameters obtained in said calibration step.

9. The method for operating as in claim 8, whereby said switching to said current of said second value is performed after a given time interval has elapsed.

10. The method for operating as in claim 8, whereby said threshold level equals said first PWM duty cycle.

11. A Red-green-blue Light Emitting Diode (RGB LED) device comprising:
- a red LED, a green LED, and a blue LED;
- a pulse width modulation (PWM) control device for setting a PWM duty cycle value;
- a current supply including at least one current source for supplying to at least one of said red, green and blue LEDs either a current of a first value or a current of a second value higher than said first value;
- a RGB LED control device arranged for:
    receiving information on a target colour point and target intensity,
    calculating, from a measured first set of tristimulus values, parameters to express colour intensity as a function of PWM duty value cycle when said current of said first value is applied to the at least one of said red, green and blue LEDs, said first set of tristimulus values measured when said current of said first value is applied to the at least one of said red, green and blue LEDs with a first PWM duty cycle, said current of said first value to which said first PWM duty cycle is applied being a first resulting current,
    calculating, from a measured second and third set of tristimulus values, parameters to express the colour intensity as a function of PWM duty cycle value when said current of said second value is applied to the at least one of said red, green and blue LEDs, said second set of tristimulus values measured when said current of said second value is applied to the at least one of said red, green and blue LEDs with a second PWM duty cycle, said second PWM duty cycle lower than said first PWM duty cycle, said current of said second value to which said second PWM duty cycle is applied being a second resulting current, whereby the second resulting current is lower than the first resulting current, said third set of tristimulus values measured when said current of said second value is applied to the at least one of said red, green and blue LEDs with a third PWM duty cycle, said third PWM duty cycle higher than said first PWM duty cycle, said current of said second value to which said third PWM duty cycle is applied being a third resulting current, whereby the third resulting current is higher than the first resulting current; and
- said RGB LED device further comprising memory for storing said calculated parameters to express the colour intensity.

12. The RGB LED device as in claim 11, wherein said current supply further comprises a current selector for selecting either said current of said first value or said current of said second value which is higher than said first value.

13. The RGB LED device as in claim 11, wherein said current supply comprises a single current source to provide either said current of said first value or said current of said second value which is higher than said first value.

14. The RGB LED device as in claim 11, wherein said current supply comprises two current sources.

15. The RGB LED device as in claim 11, wherein said current supply further comprises a switchable element controllable by a PWM control.

\* \* \* \* \*